United States Patent
Berger et al.

(10) Patent No.: US 11,930,389 B2
(45) Date of Patent: Mar. 12, 2024

(54) TARGET BLER CHANGE REQUEST

(71) Applicant: QUALCOMM Incorporated, San Diego, CA (US)

(72) Inventors: Peer Berger, Hod Hasharon (IL); Shay Landis, Hod Hasharon (IL); Assaf Touboul, Netanya (IL)

(73) Assignee: QUALCOMM Incorporated, San Diego, CA (US)

(*) Notice: Subject to any disclaimer, the term of this patent is extended or adjusted under 35 U.S.C. 154(b) by 139 days.

(21) Appl. No.: 17/645,000

(22) Filed: Dec. 17, 2021

(65) Prior Publication Data
US 2023/0199547 A1    Jun. 22, 2023

(51) Int. Cl.
*H04W 28/02* (2009.01)
*H04L 1/00* (2006.01)
*H04L 1/20* (2006.01)

(52) U.S. Cl.
CPC ....... *H04W 28/0236* (2013.01); *H04L 1/0009* (2013.01); *H04L 1/0026* (2013.01); *H04L 1/203* (2013.01)

(58) Field of Classification Search
CPC ............. H04W 28/0236; H04L 1/0009; H04L 1/0026; H04L 1/203
See application file for complete search history.

(56) References Cited

U.S. PATENT DOCUMENTS

| | | | | |
|---|---|---|---|---|
| 2008/0049710 A1* | 2/2008 | Zeira | ..................... | H04W 52/54 370/345 |
| 2008/0186916 A1* | 8/2008 | Oshiba | .................. | H04L 1/0025 370/330 |
| 2009/0069042 A1* | 3/2009 | Wang | ..................... | H04W 52/12 455/522 |
| 2013/0237277 A1* | 9/2013 | Brus | ...................... | H04W 52/12 455/522 |
| 2016/0353374 A1* | 12/2016 | Höglund | ............... | H04L 1/0003 |
| 2017/0094576 A1* | 3/2017 | Kazmi | ............. | H04W 72/0453 |
| 2018/0212742 A1* | 7/2018 | Takeda | .................. | H04L 5/0057 |
| 2019/0379518 A1* | 12/2019 | Yang | ..................... | H04W 72/51 |
| 2020/0092858 A1* | 3/2020 | Ye | .............................. | H04L 1/08 |
| 2020/0304230 A1* | 9/2020 | Papasakellariou | .... | H04L 5/0094 |

(Continued)

FOREIGN PATENT DOCUMENTS

| | | | | |
|---|---|---|---|---|
| EP | 4170942 A1 * | 4/2023 | ........... | H04L 1/0003 |
| JP | 2008048175 A * | 2/2008 | | |
| WO | WO-2022086232 A1 * | 4/2022 | ........... | H04L 1/0003 |

OTHER PUBLICATIONS

Google Patents—Translated document—JP 2008048175 A, "Mobile Communication Terminal for Mobile Communication System E.g. Wide Band Code Division Multiple Access System, Changes Target Block Error Rate When Change of Target Error Rate Is Permitted With Network", Kitayama et al. (Year: 2008).*

*Primary Examiner* — Chi H Pham
*Assistant Examiner* — Vladislav Y Agureyev
(74) *Attorney, Agent, or Firm* — Procopio, Cory, Hargreaves & Savitch LLP/Qualcomm Incorporated

(57) ABSTRACT

Methods, apparatuses, and computer-readable storage medium for changing BLER are provided. An example method may include transmitting, to the base station, a request to change a target BLER. The example method may further include receiving, from the base station and in response to the request, an indication to change the target BLER.

28 Claims, 12 Drawing Sheets

(56) References Cited

U.S. PATENT DOCUMENTS

| | | | |
|---|---|---|---|
| 2020/0305183 A1* | 9/2020 | Papasakellariou | H04L 1/0026 |
| 2020/0343957 A1* | 10/2020 | Ko | H04L 1/0026 |
| 2020/0383155 A1* | 12/2020 | Pati | H04W 76/34 |
| 2021/0050935 A1* | 2/2021 | Chen | H04W 52/12 |
| 2021/0084596 A1* | 3/2021 | Lee | H04W 52/242 |
| 2021/0144037 A1* | 5/2021 | Yamamoto | H04J 99/00 |
| 2021/0336688 A1* | 10/2021 | Lee | H04W 4/40 |
| 2021/0410182 A1* | 12/2021 | Zhang | H04W 74/006 |
| 2022/0149980 A1* | 5/2022 | Skärby | G06N 3/08 |
| 2022/0182175 A1* | 6/2022 | Kvernvik | H04L 1/0009 |
| 2022/0264480 A1* | 8/2022 | Thomas | H04W 72/1268 |
| 2022/0286880 A1* | 9/2022 | Kakishima | H04W 24/08 |
| 2023/0059750 A1* | 2/2023 | Beale | H04L 1/0026 |
| 2023/0090593 A1* | 3/2023 | Kim | H04L 1/00 370/252 |
| 2023/0198655 A1* | 6/2023 | Yoon | H04L 1/1822 370/329 |
| 2023/0283429 A1* | 9/2023 | Park | H04L 1/1854 370/329 |

\* cited by examiner

TARGET BLER CHANGE REQUEST

TECHNICAL FIELD

The present disclosure relates generally to communication systems, and more particularly, to wireless communication systems with a target block error rate (BLER).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be further configured to transmit, to a base station, a request to change a target BLER. The memory and the at least one processor coupled to the memory may be further configured to receive, from the base station and in response to the request, an indication to change the target BLER.

In another aspect of the disclosure, a method, a computer-readable medium, and an apparatus at a base station are provided. The apparatus may include a memory and at least one processor coupled to the memory. The memory and the at least one processor coupled to the memory may be further configured to receive, from a UE, a request to change a target BLER. The memory and the at least one processor coupled to the memory may be further configured to transmit, to the UE and in response to the request, an indication to change the target BLER.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
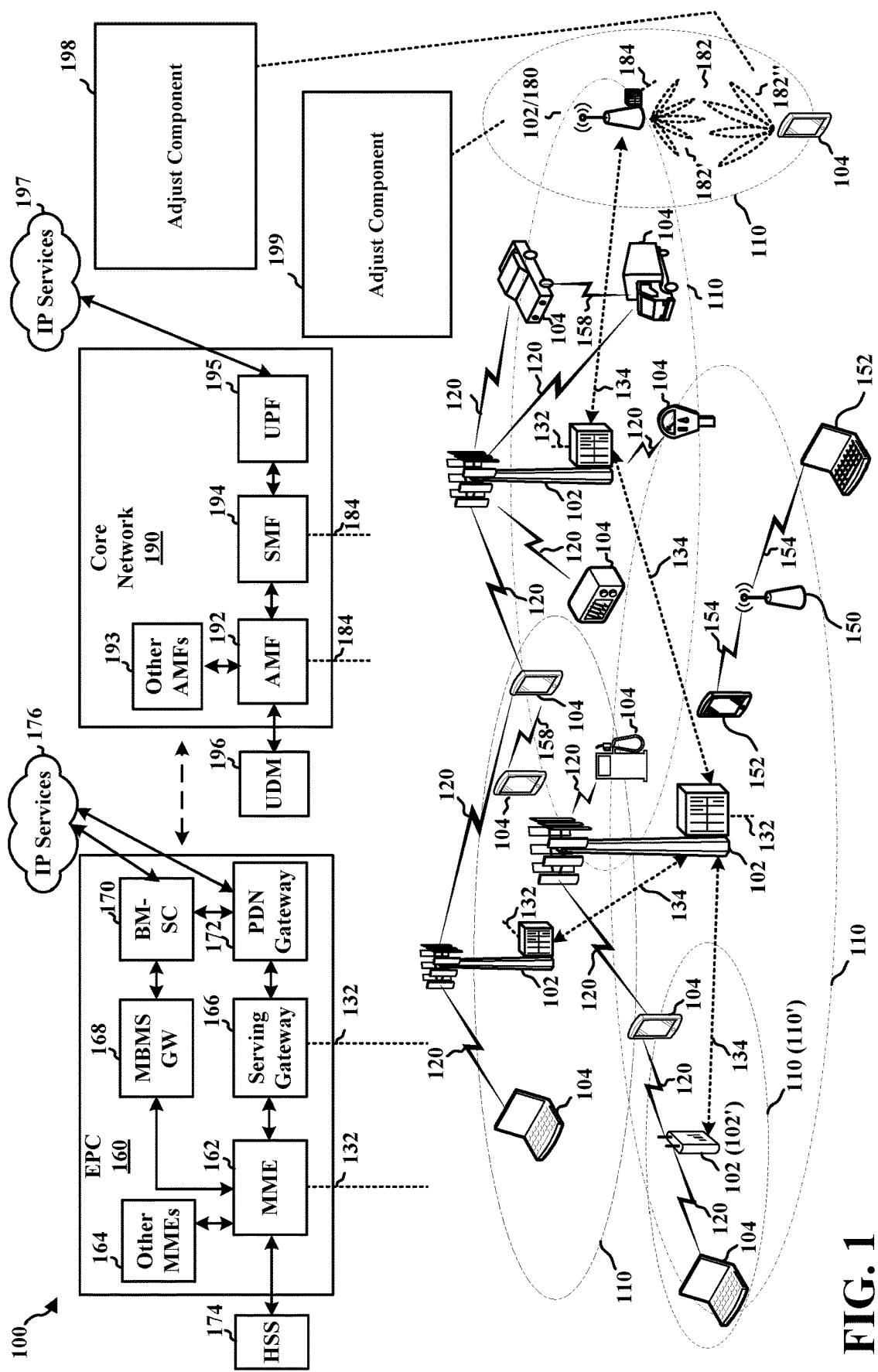
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an adjust component 198. In some aspects, the adjust component 198 may be configured to transmit, to a base station, a request to change a target BLER. In some aspects, the adjust component 198 may be further configured to receive, from the base station and in response to the request, an indication to change the target BLER.

In certain aspects, the base station 180 may include an adjust component 199. In some aspects, the adjust component 199 may be configured to receive, from a UE, a request to change a target BLER. In some aspects, the adjust component 199 may be further configured to transmit, to the UE and in response to the request, an indication to change the target BLER.

Although the following description may be focused on 5G NR, the concepts described herein may be applicable to other similar areas, such as LTE, LTE-A, CDMA, GSM, and other wireless technologies.

Figure 2:
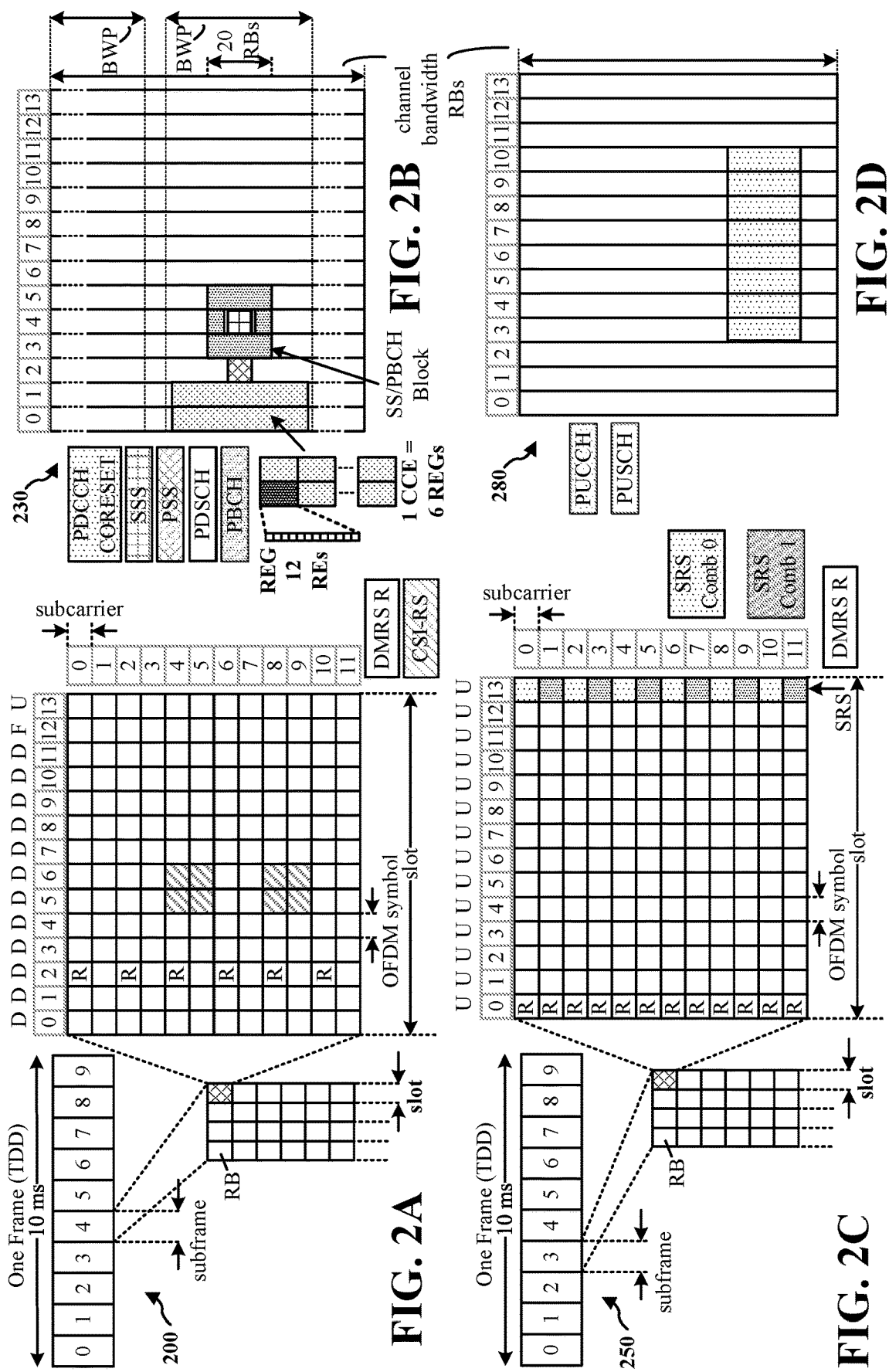
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |

| μ | SCS<br>Δf = 2^μ · 15[kHz] | Cyclic prefix |
|---|---|---|
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
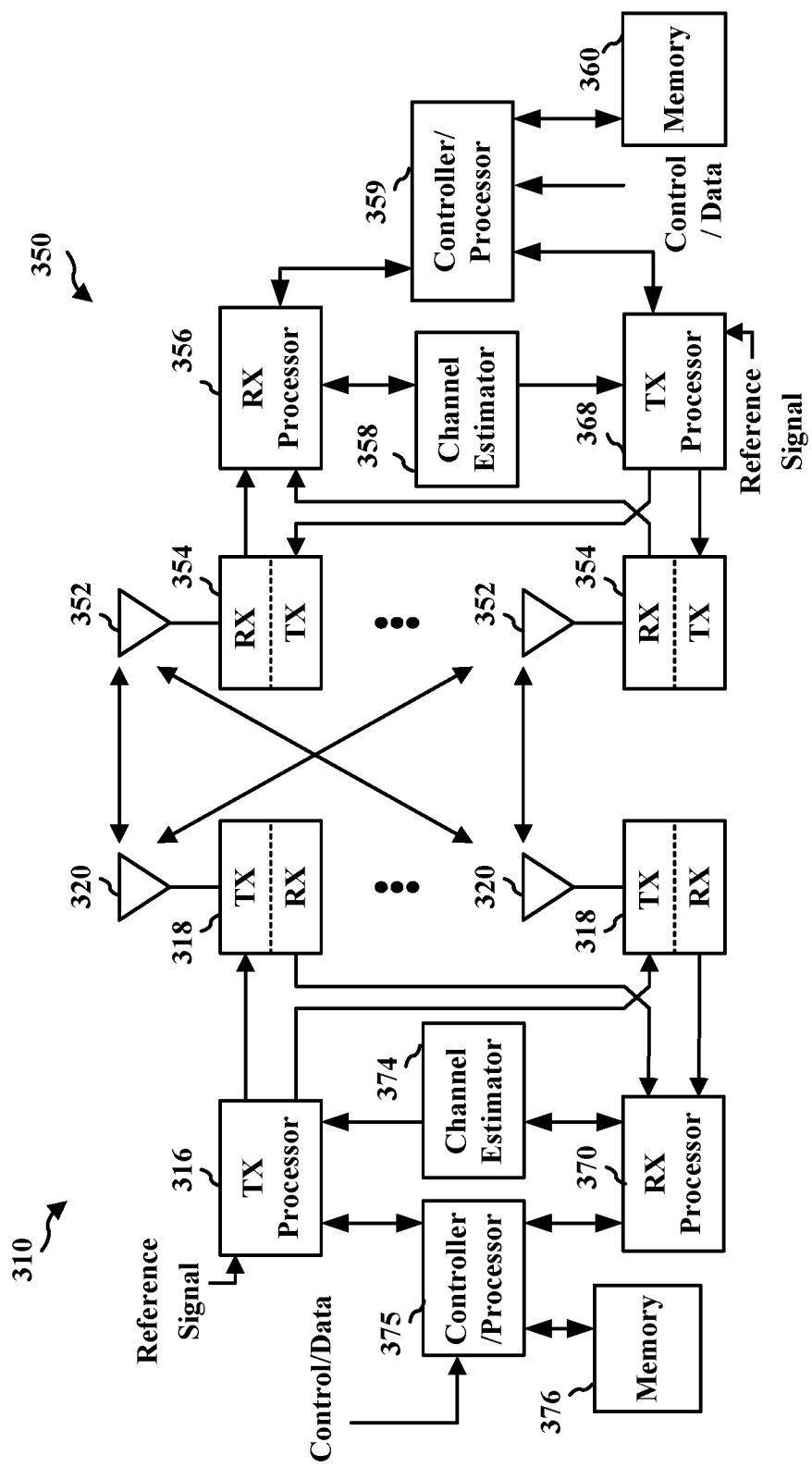
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with adjust component 198 of FIG. 1.

At least one of the TX processor 316, the RX processor 370, and the controller/processor 375 may be configured to perform aspects in connection with adjust component 199 of FIG. 1.

In some wireless communication systems, a base station may target a certain BLER (e.g., 10% BLER) based on a number of factors, such as transmission power, delay, retransmission, or the like. A receiver at a UE may use near-maximum likelihood (ML) demodulators (which may also be referred to as a near-ML demapper). In some aspects, the near-ML demodulators may be zero-forcing (ZF)-based or minimum mean square error (MMSE)-based. While linear algorithms such as MMSE may have the lowest complexity among the above three categories, they also tend to have the lowest accuracy, falling below that of an optimal ML detector, such as a max-log-maximum a posteriori (MAP) (MLM) detector. However, actual ML may be prohibitively computationally complex in practice and near-ML may be used instead.

Figure 4:
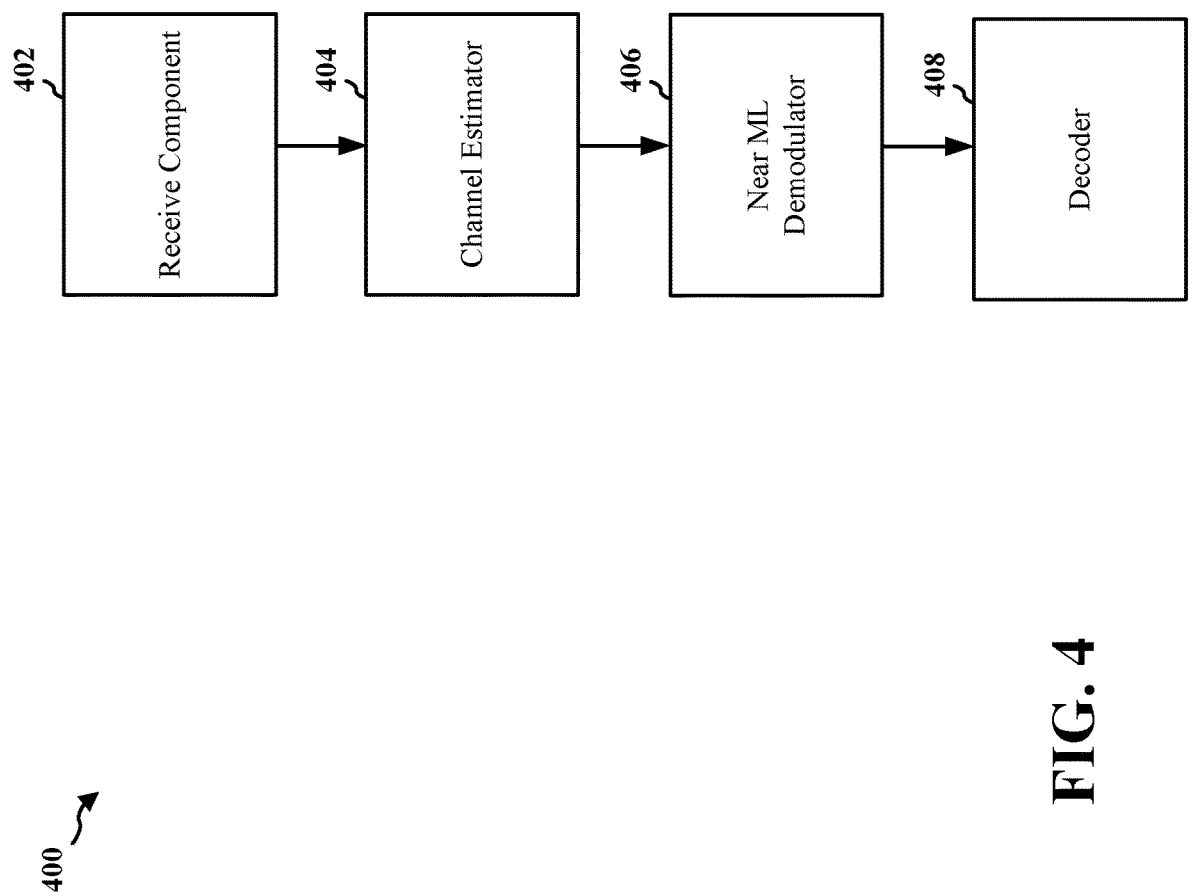
FIG. 4 illustrates example reception and decoding at a UE.

As illustrated in example 400 of FIG. 4, in order to receive a transmission, such as a transmission from a base station, a UE may include a receive component 402, a channel estimator 404, a near-ML demodulator 406, and a decoder 408. The UE may receive one or more transmissions, such as beamformed transmissions from a base station, at the receive component 402. In some aspects, the one or more transmissions may correspond to one or more modulated signals modulated by the base station and transmitted to the UE. In some aspects, the receive component 402 may be part of the receiver 354/the antenna 352. In some aspects, the channel estimator may be part of the channel estimator 358. In some aspects, the near-ML demodulator 406 may be part of the RX processor 356. In some aspects, the decoder 408 may be part of the RX processor 356.

The receive component 402 may transmit, to the channel estimator 404, the one or more received modulated signals from the one or more transmissions. The channel estimator 404 may determine a channel, which may be represented by a matrix (e.g., matrix H), by performing a channel estimate procedure for one or more REs over which the one or more transmissions are received. The matrix H may include one or more constellation symbols that may each be associated with one or more phases and amplitudes with different modulation schemes that may be used for modulating symbols. Each constellation symbol may be further associated with a bit sequence that may be represented by a modulated signal.

The UE may further process the estimated channel (e.g., channel H) and amplitude and phase vectors. The near-ML demodulator 406 may be near-ML and may calculate distances between representations of the received signal and the constellation symbols, and forward the calculated distances to the decoder 408 to decode the received signals. The decoder 408 may determine a logarithmic-likelihood ratio (LLR) of the received modulated signal based on the calculated distances. The decoder 408 may further determine a bit sequence from the LLR(s) and perform error detection on the bit sequence (e.g., a cyclic redundancy check (CRC)) to determine if the bit sequence passed error detection. The near-ML demodulator 406 may balance between complexity and performance and may be one of the largest power consumers in a receiver of the UE. The complexity of the near-ML demodulator 406 may be a function of a target BLER. The power consumption of the UE may be a function of the demodulator of the near-ML demodulator 406.

In some aspects, the near-ML demodulator 406 may possess processing capability based on a variety of demodulator, such as an MMSE algorithm, a ZF algorithm, or the like. The near-ML demodulator 406 may be capable of adjusting a percentage of REs processed via each algorithm based on a target BLER or other conditions. For example, if the target BLER is higher, the near-ML demodulator 406 may use a higher percentage of near-ML processing and a lower percentage of MMSE processing. In another example, if the target BLER is lower, the near-ML demodulator 406 may use a lower percentage of near-ML processing and a higher percentage of MMSE processing to save power.

To achieve a higher target BLER for the one or more modulated signals, more processing may be performed by the UE, such as the near-ML demodulator 406, which may consume a higher amount of power. On the other hand, if the target BLER is lower, less processing may be performed by the near-ML demodulator and the power consumed may be significantly smaller. In addition, with a lower target BLER, a lower amount of retransmissions may be performed, resulting in additional saved power. A UE may adjust the target BLER based on a variety of conditions, such as signaling-related conditions, battery level, transmission priorities associated with the UE, delay, or other conditions related to the UE's operation. A lower BLER may result in less complexity, less power consumption, and smaller delay.

Aspects provided herein may save power by providing signaling that enables a UE or a base station to adjust the target BLER, which may result in an adjusted computational complexity at a demodulator of the receiver and potential power saving. Adjusting computational complexity at the demodulator may also result in power saving at the decoder. In some aspects, such adjustment may be initiated by a UE. In some aspects, such adjustment may be initiated by a base station.

Figure 5:
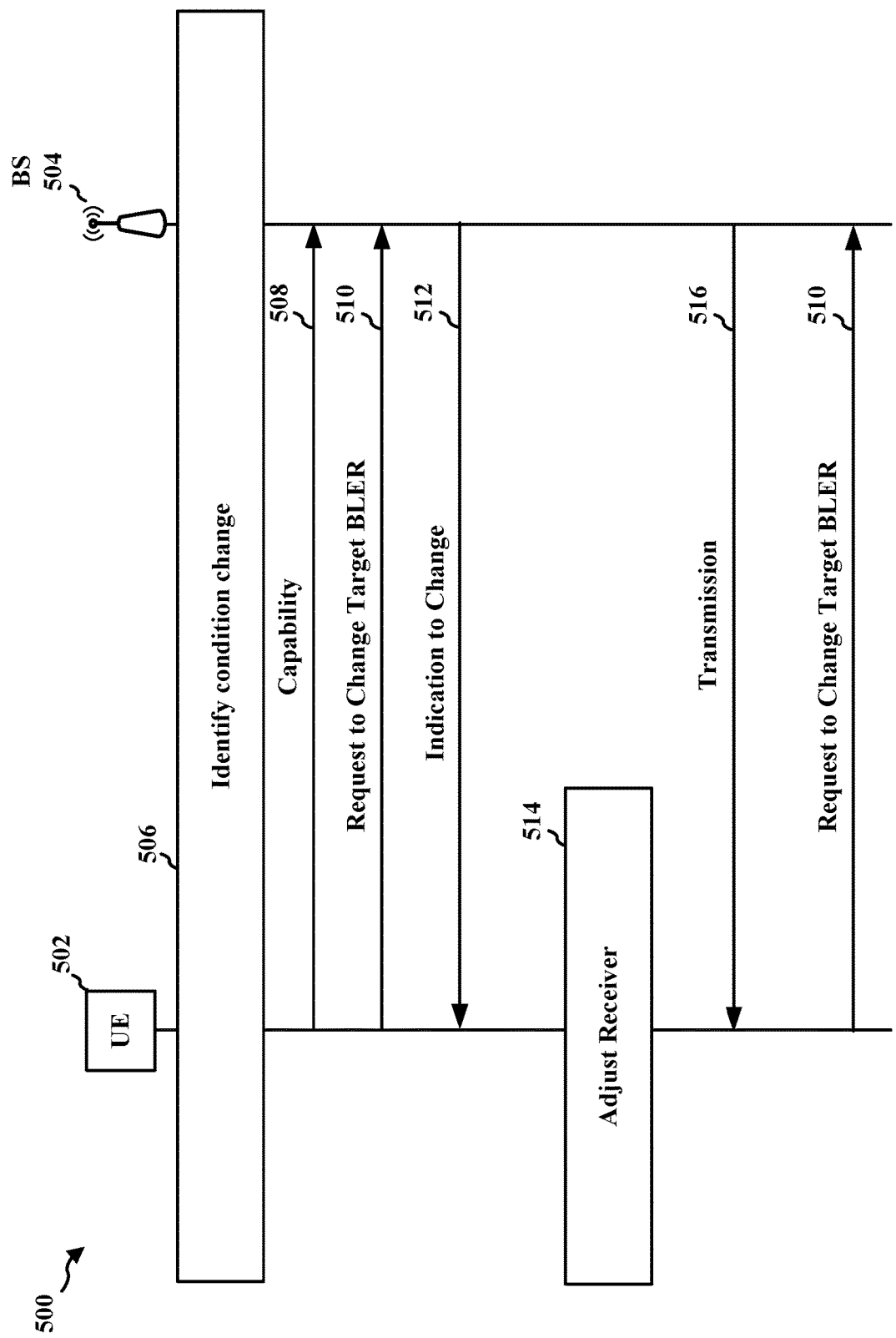
FIG. 5 illustrates example communications between a UE and a base station.

FIG. 5 is a diagram 500 illustrating example communications between a UE 502 and a base station 504. In some aspects, the UE 502 may include the receive component 402, the channel estimator 404, the near-ML demodulator 406, and the decoder 408. As illustrated in FIG. 5, the UE 502 or the base station 504 may identify one or more changes in a condition at 506 and may accordingly trigger the UE 502 to transmit a request to change a target BLER 510.

In some aspects, the UE 502 may transmit a capability 508 indicating that the UE is capable of decreasing a complexity of a demodulator at the UE based on a target BLER change. In some aspects, the capability 508 may further indicate that a demodulator's complexity at the UE 502 may be a function of the target BLER.

In some aspects, the UE 502 may transmit the request to change the target BLER 510 to the base station. Upon receiving the request to change the target BLER 510 from the UE 502, the base station 504 may calculate and consider the UE 502's capability and the transmitted request to change the target BLER 510 to determine whether to approve the request to change the target BLER 510.

If the base station 504 determines to approve the request to change the target BLER 510, the base station 504 may transmit a change indication 512 to change the target BLER 510 and configure the UE with a new target BLER, which may be lower than an original target BLER. At 514, the UE 502 may adjust a receiver, such as a demodulator, a decoder, a channel estimator, or other components of the receiver, based on the adjusted target BLER. After adjusting the receiver at 514, the UE 502 may accordingly receive a transmission 516 from the base station 504 based on the adjusted BLER.

In some aspects, the request to change target BLER 510 may be aperiodic. For example, the UE 502 or the base station 504 may trigger the request to change the target BLER 510 on demand based on certain conditions, such as signaling-related conditions, battery level, transmission priorities associated with the UE, or other conditions related to the UE's operation. In one example, if the UE 502 determines that the UE 502's battery level is below a threshold, the UE 502 may transmit the request to change the target BLER 510 to the base station 504 to adjust the BLER. By adjusting the BLER, the UE 502 may save power and may operate for a longer period of time. In another example, if the UE 502 determines that the UE 502's communications are a low priority, the UE 502 may request to change the target BLER 510 to the base station 504.

In some aspects, the request to change the target BLER 510 may be periodic, as illustrated in FIG. 5. For example, the UE 502 may be configured to periodically transmit the request to change the target BLER 510 based on a current condition, so that the UE 502 may potentially save power by periodically adjusting to a more suitable BLER.

Figure 6:
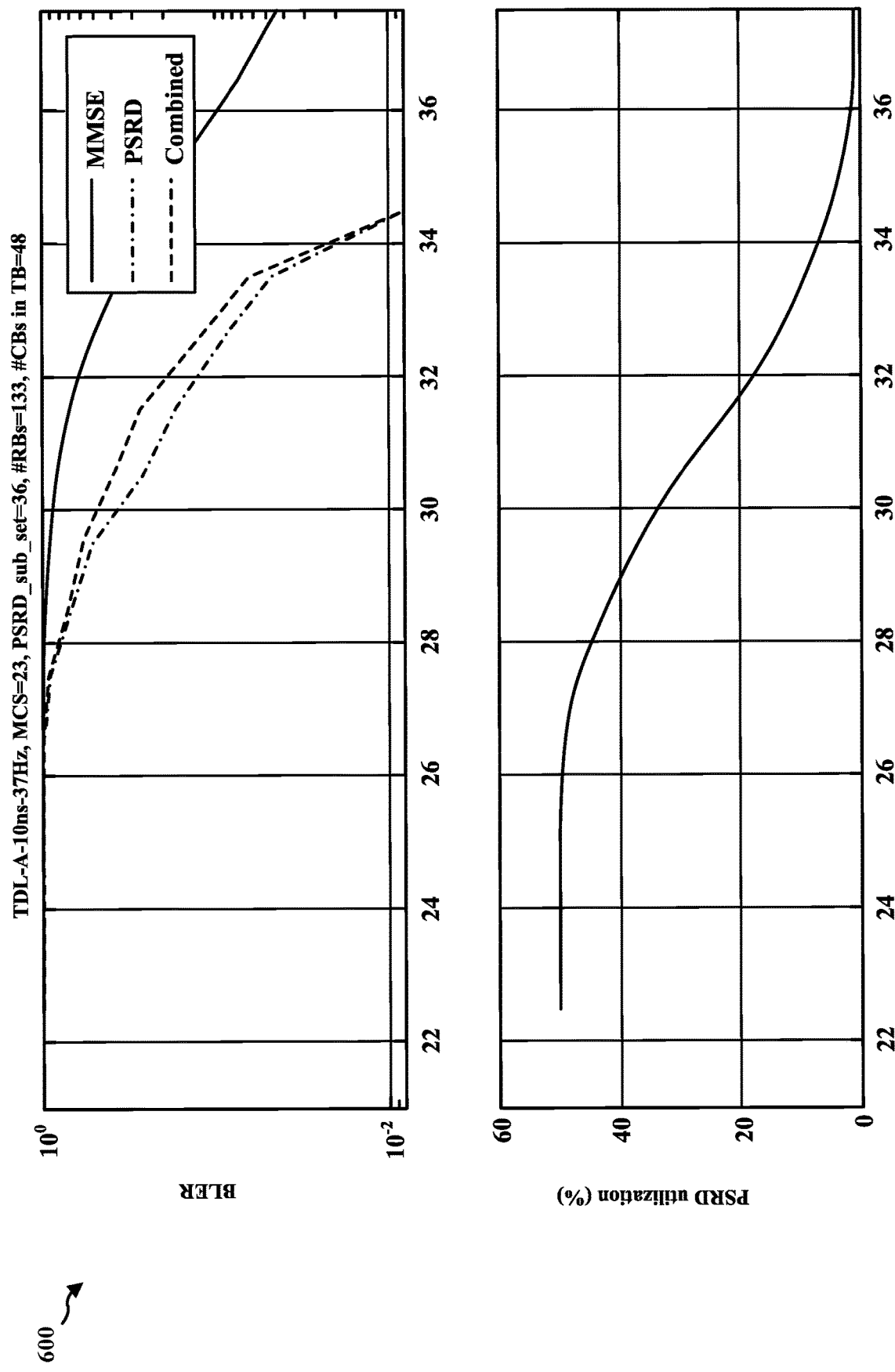
FIG. 6 illustrates example correlation with resource utilization ratio and target BLER.

FIG. 6 is a diagram 600 illustrating an example correlation between a resource utilization ratio and a target BLER. As illustrated in FIG. 6, as the target BLER decreases, the utilization ratio may also decrease which may lead to power savings. For example, a target BLER changing from 1% to 10% may result in a 50% reduction in the utilization ratio and may result in a significant power savings.

Figure 7:
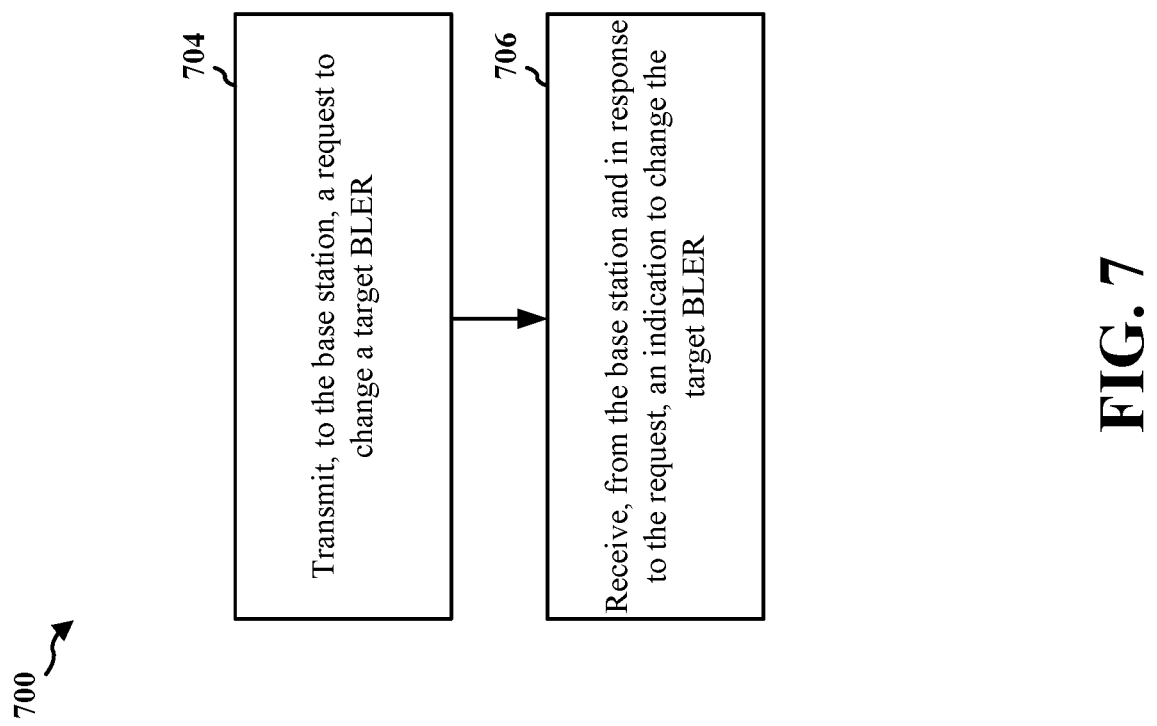
FIG. 7 is a flowchart of a method of wireless communication.

FIG. 7 is a flowchart 700 of a method of wireless communication. The method may be performed by a UE (e.g., the UE 104, the UE 502; the apparatus 1102).

At 704, the UE may transmit, to a base station, a request to change a target BLER. For example, the UE 502 may transmit, to the base station 504, a request to change the target BLER. In some aspects, 704 may be performed by BLER component 1140 in FIG. 11. In some aspects, the request to change the target BLER may be received based on a change in a condition associated with the target BLER. In some aspects, the change in the condition may correspond to a change in a power consumption of the UE. In some aspects, the request to change the target BLER may be triggered by the UE based on the change in the condition. In some aspects, the request to change the target BLER may be triggered by the base station. In some aspects, the request to change the target BLER may be aperiodic. In some aspects, the request to change the target BLER may be periodic. In some aspects, the target BLER may be negatively correlated with a power consumption of the UE. In some aspects, the target BLER may be negatively correlated with a retransmission probability. In some aspects, the UE may further include a receiver using near-ML demodulation and MMSE demodulation. In some aspects, the UE may transmit the request to change the BLER via a transceiver.

At 706, the UE may receive, from the base station and in response to the request, an indication to change the target BLER. For example, the UE 502 may receive, from the base station 504 and in response to the request 510, a change indication 512 to change the target BLER. In some aspects, 706 may be performed by BLER component 1140 in FIG. 11. In some aspects, the UE may receive the indication to change the target BLER via a transceiver.

Figure 8:
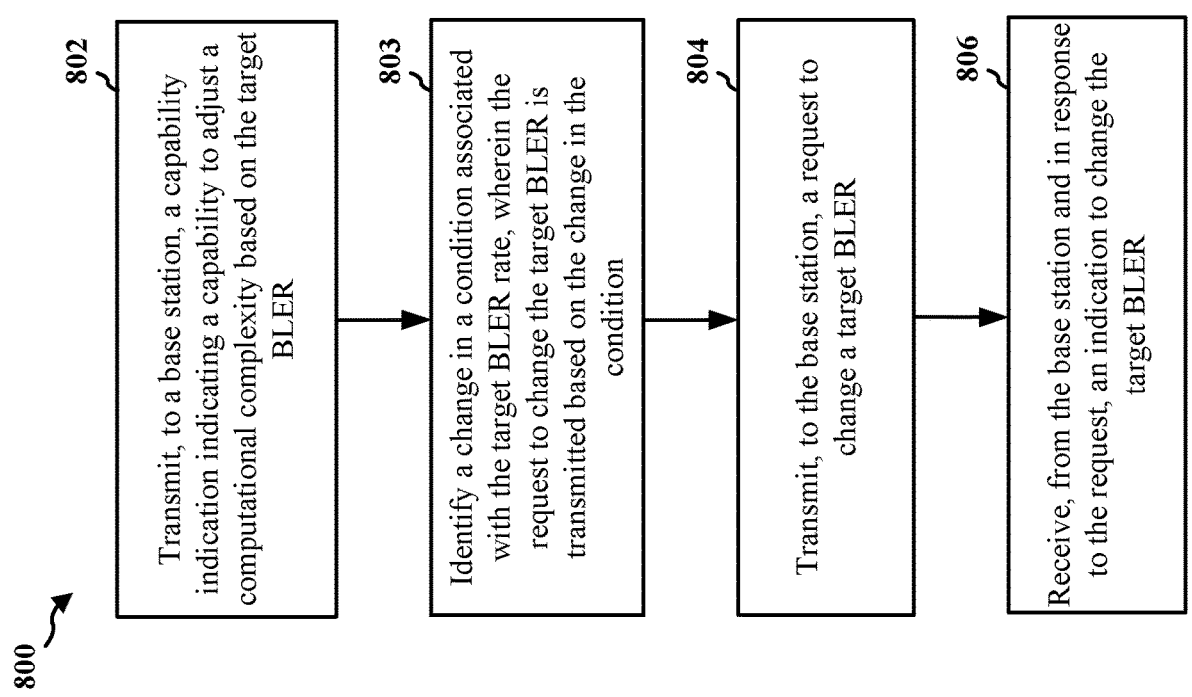
FIG. 8 is a flowchart of a method of wireless communication.

FIG. 8 is a flowchart 800 of a method of wireless communication. The method may be performed by a UE (e.g., the UE 104, the UE 502; the apparatus 1102).

At 802, the UE may transmit, to a base station, a capability indication indicating a capability to adjust a computational complexity based on the target BLER. For example, the UE 502 may transmit, to a base station 504, a capability indication (e.g., 508) indicating a capability to adjust a computational complexity based on the target BLER. In some aspects, 802 may be performed by BLER component 1140 in FIG. 11. In some aspects, the capability indication may further indicate a capability to adjust a complexity associated with a near-ML demodulation at the UE based on changing the target BLER. In some aspects, the UE may transmit the capability indication via a transceiver.

At 803, the UE may identify a change in a condition associated with the target BLER rate. In some aspects, the request to change the target BLER may be transmitted based on the change in the condition. For example, the UE 502 may identify a change in a condition associated with the target BLER rate (e.g., at 506). In some aspects, 803 may be performed by BLER component 1140 in FIG. 11.

At 804, the UE may transmit, to the base station, a request to change the target BLER. For example, the UE 502 may transmit, to the base station 504, a request to change the target BLER. In some aspects, 804 may be performed by BLER component 1140 in FIG. 11. In some aspects, the request to change the target BLER may be received based on a change in a condition associated with the target BLER. In some aspects, the change in the condition may correspond to a change in a power consumption of the UE. In some aspects, the request to change the target BLER may be triggered by the UE based on the change in the condition. In some aspects, the request to change the target BLER may be triggered by the base station. In some aspects, the request to change the target BLER may be aperiodic. In some aspects, the request to change the target BLER may be periodic. In some aspects, the target BLER may be negatively correlated with a power consumption of the UE. In some aspects, the target BLER may be negatively correlated with a retransmission probability. In some aspects, the UE may further include a receiver using near-ML demodulation and MMSE demodulation. In some aspects, the UE may transmit the request to change the BLER via a transceiver. In some aspects, the UE may include a demodulator capable of adjusting a complexity associated with a near-ML demodulation based on changing the target BLER, such as the near-ML demodulator 406.

At 806, the UE may receive, from the base station and in response to the request, an indication to change the target BLER. For example, the UE 502 may receive, from the base station 504 and in response to the request 510, a change indication 512 to change the target BLER. In some aspects, 806 may be performed by BLER component 1140 in FIG. 11. In some aspects, the UE may receive the indication to change the target BLER via a transceiver.

Figure 9:
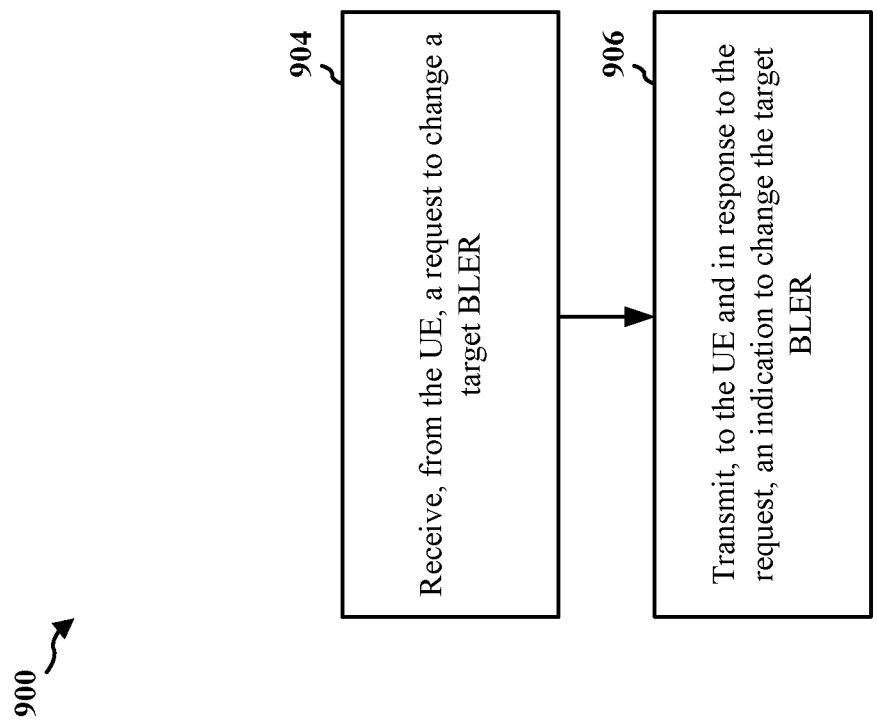
FIG. 9 is a flowchart of a method of wireless communication.

FIG. 9 is a flowchart 900 of a method of wireless communication. The method may be performed by a base station (e.g., the base station 102/180, the base station 504; the apparatus 1202).

At 904, the base station may receive, from a UE, a request to change the target BLER. For example, the base station 504 may receive, from the UE 502, a request to change the target BLER. In some aspects, 904 may be performed by BLER component 1240 in FIG. 12. In some aspects, the request to change the target BLER may be received based on a change in a condition associated with the target BLER. In some aspects, the change in the condition may correspond to a change in a power consumption of the UE. In some aspects, the request to change the target BLER may be triggered by the UE based on the change in the condition. In some aspects, the request to change the target BLER may be triggered by the base station. In some aspects, the request to change the target BLER may be aperiodic. In some aspects, the request to change the target BLER may be periodic. In some aspects, the target BLER may be negatively correlated with a power consumption of the UE. In some aspects, the target BLER may be negatively correlated with a retransmission probability. In some aspects, the UE may further include a receiver using near-ML demodulation and MMSE demodulation. In some aspects, the base station may receive the request via a transceiver.

At 906, the base station may transmit, to the UE and in response to the request, an indication to change the target BLER. For example, the base station 504 may transmit, to the UE 502 and in response to the request 510, a change indication 512 to change the target BLER. In some aspects, 906 may be performed by BLER component 1240 in FIG. 12. In some aspects, the base station may transmit the indication via a transceiver.

Figure 10:
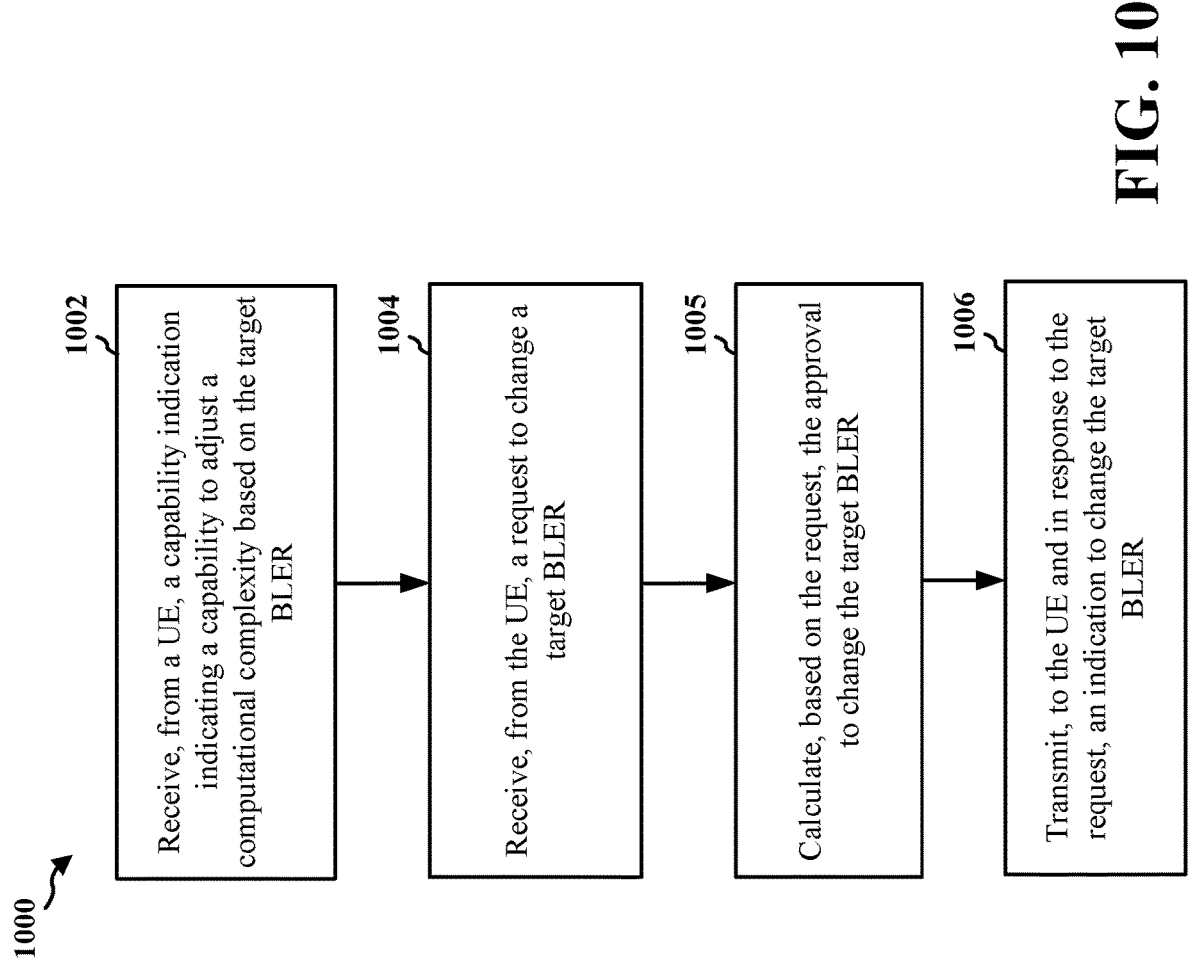
FIG. 10 is a flowchart of a method of wireless communication.

FIG. 10 is a flowchart 1000 of a method of wireless communication. The method may be performed by a base station (e.g., the base station 102/180, the base station 504; the apparatus 1202).

At 1002, the base station may receive, from a UE, a capability indication indicating a capability to adjust a computational complexity based on the target BLER. For example, the base station 504 may receive, from a UE 502, a capability indication (e.g., 508) indicating a capability to adjust a computational complexity based on the target BLER. In some aspects, 1002 may be performed by BLER component 1240 in FIG. 12. In some aspects, the capability indication may further indicate a capability to adjust a complexity associated with a near-ML demodulation at the UE based on changing the target BLER. In some aspects, the base station may receive the capability indication via a transceiver.

At 1004, the base station may receive, from the UE, a request to change the target BLER. For example, the base station 504 may receive, from the UE 502, a request to change the target BLER. In some aspects, 1004 may be performed by BLER component 1240 in FIG. 12. In some aspects, the request to change the target BLER may be received based on a change in a condition associated with the target BLER. In some aspects, the change in the condition may correspond to a change in a power consumption of the UE. In some aspects, the request to change the target BLER may be triggered by the UE based on the change in the condition. In some aspects, the request to change the target BLER may be triggered by the base station. In some aspects, the request to change the target BLER may be aperiodic. In some aspects, the request to change the target BLER may be periodic. In some aspects, the target BLER may be negatively correlated with a power consumption of the UE. In some aspects, the target BLER may be negatively correlated with a retransmission probability. In some aspects, the UE may further include a receiver using near-ML demodulation and MMSE demodulation. In some aspects, the base station may receive the request via a transceiver.

At 1005, the base station may calculate, based on the request, the indication to change the target BLER. The indication to change the target BLER may be transmitted based on the calculation. For example, the base station 504 may calculate, based on the request, the change indication 512 to change the target BLER. In some aspects, 1005 may be performed by BLER component 1240 in FIG. 12.

At 1006, the base station may transmit, to the UE and in response to the request, an indication to change the target BLER. For example, the base station 504 may transmit, to the UE 502 and in response to the request 510, a change indication 512 to change the target BLER. In some aspects, 1006 may be performed by BLER component 1240 in FIG. 12. In some aspects, the base station may transmit the indication via a transceiver.

Figure 11:
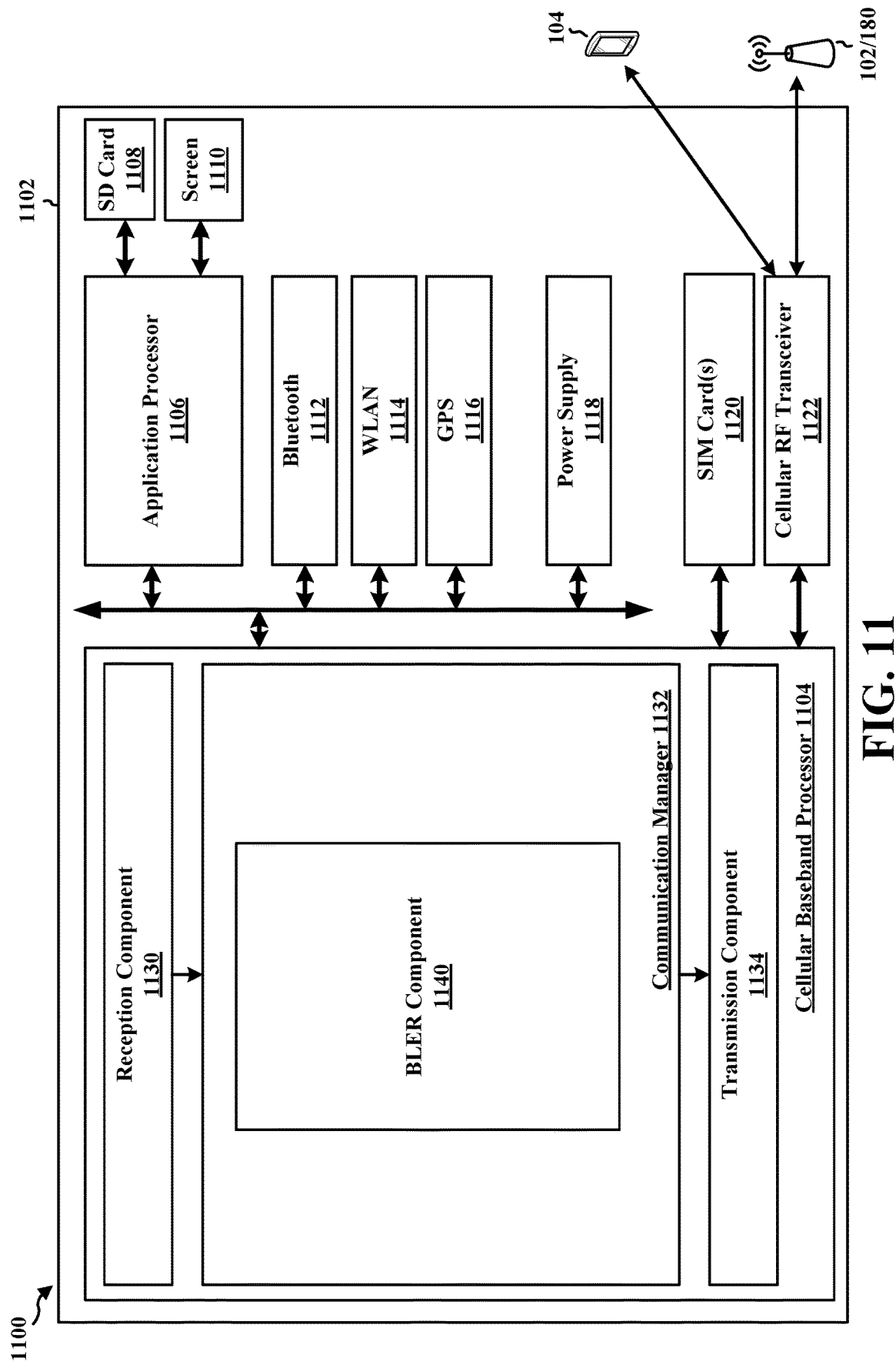
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 may include a BLER component 1140 that is configured to transmit, to a base station, a capability indication indicating a capability to adjust a computational complexity based on the target BLER, identify a change in a condition associated with the target BLER, transmit, to the base station, a request to change the target BLER, or receive, from the base station and in response to the request, an indication to change the target BLER, e.g., as described in connection with FIGS. 7-8.

The apparatus may include additional components that perform each of the blocks of the algorithm in the flowcharts of FIGS. 7-8. As such, each block in the flowcharts of FIGS. 7-8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, may include means for transmitting, to the base station, a request to change a target BLER. The cellular baseband processor 1104 may further include means for identifying a change in a condition associated with the target BLER. The cellular baseband processor 1104 may further include means for transmitting, to a base station, a capability indication indicating a capability to adjust a computational complexity based on the target BLER. The cellular baseband processor 1104 may further include means for receiving, from the base station and in response to the request, an indication to change the target BLER. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
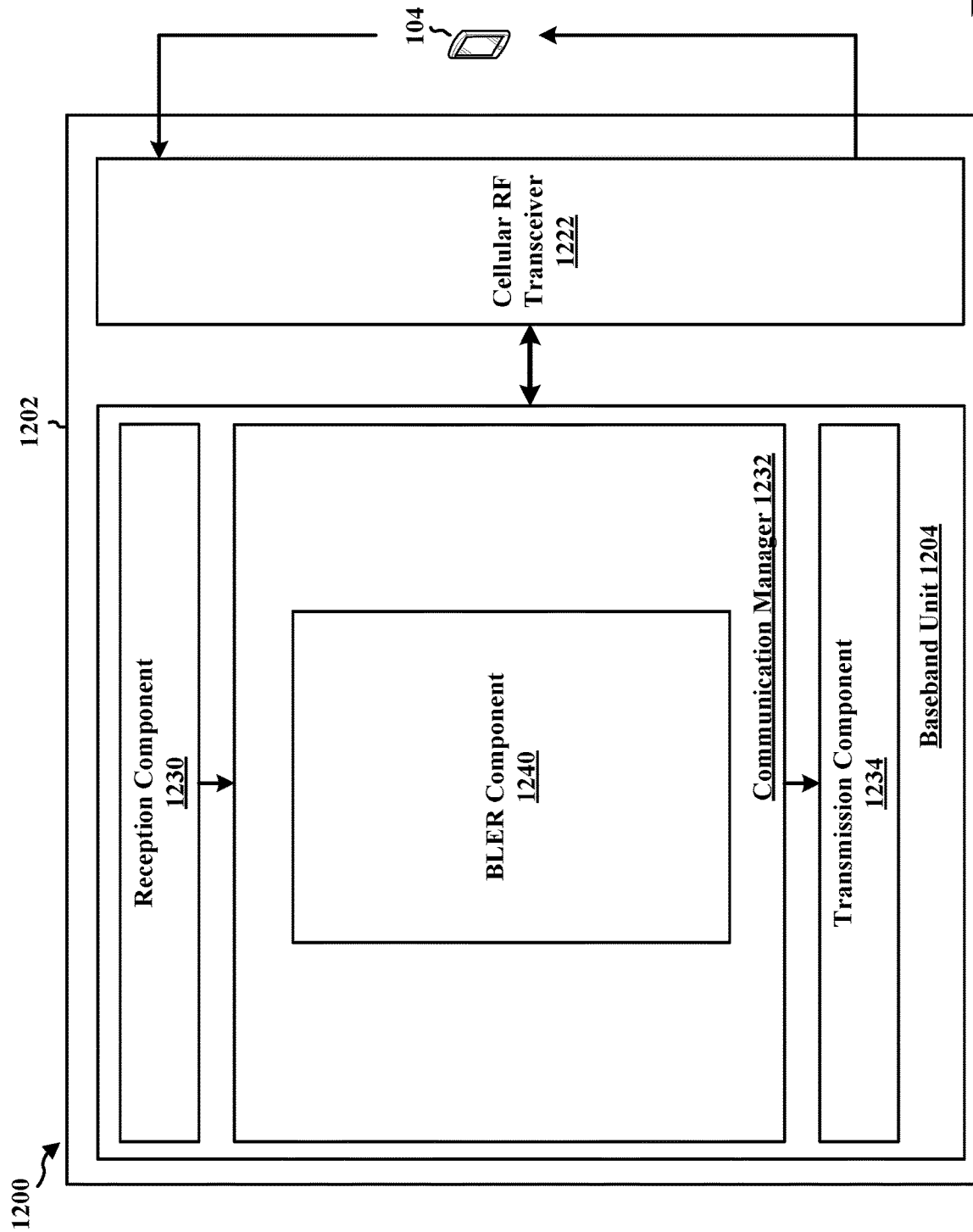
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1102 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 may include a BLER component 1240 that may receive, from a UE, a capability indication indicating a capability to adjust a computational complexity based on the target BLER, receive, from the UE, a request to change the target BLER, calculate, based on the request, the indication to change the target BLER, and transmit, to the UE and in response to the request, an indication to change the target BLER, e.g., as described in connection with FIGS. 9-10.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, may include means for receiving, from the UE, a request to change the target BLER. The baseband unit 1204 may further include means for receiving, from a UE, a capability indication indicating a capability to adjust a computational complexity based on the target BLER. The baseband unit 1204 may further include means for transmitting, to the UE and in response to the request, an indication to change the target BLER. The baseband unit 1204 may further include means for calculating, based on the request, the indication to change the target BLER. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects provided herein may save power by providing signaling that enables a UE or a base station to adjust target BLER, which may result in adjusted computational complexity at a demodulator of the receiver. In some aspects, such adjustment may be initiated by a UE. In some other aspects, such adjustment may be initiated by a base station.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: transmit, to the base station, a request to change a BLER of the UE; and receive, from the base station and in response to the request, an indication to change the target BLER.

Aspect 2 is the apparatus of aspect 1, wherein the at least one processor is further configured to: identify a change in a condition associated with the target BLER, wherein the request to change the target BLER is transmitted based on the change in the condition.

Aspect 3 is the apparatus of any of aspects 1-2, wherein the change in the condition corresponds to a change in a power consumption of the UE.

Aspect 4 is the apparatus of any of aspects 1-3, wherein the request to change the target BLER is triggered by the UE based on the change in the condition.

Aspect 5 is the apparatus of any of aspects 1-4, wherein the request to change the target BLER is triggered by the base station.

Aspect 6 is the apparatus of any of aspects 1-5, further comprising a demodulator capable of adjusting a complexity associated with a near-ML demodulation based on changing the target BLER.

Aspect 7 is the apparatus of any of aspects 1-6, wherein the request to change the target BLER is aperiodic or periodic.

Aspect 8 is the apparatus of any of aspects 1-7, wherein the at least one processor is further configured to: transmit, to the base station, a capability indication indicating a capability to adjust a computational complexity based on the target BLER.

Aspect 9 is the apparatus of any of aspects 1-8, wherein the target BLER is negatively correlated with a power consumption of the UE.

Aspect 10 is the apparatus of any of aspects 1-9, wherein the target BLER is negatively correlated with a retransmission probability.

Aspect 11 is the apparatus of any of aspects 1-10, wherein the UE further comprises a receiver using near-ML demodulation and MMSE demodulation.

Aspect 12 is the apparatus of any of aspects 1-11, further comprising a transceiver coupled to the at least one processor, the at least one processor configured to: transmit the request to change the target BLER to the base station via the transceiver; and receive, from the base station and in response to the request, an indication to change the target BLER via the transceiver.

Aspect 13 is an apparatus for wireless communication at a base station, comprising: a memory; and at least one processor coupled to the memory and configured to: receive, from the UE, a request to change a BLER of the UE; and transmit, to the UE and in response to the request, an indication to change the target BLER.

Aspect 14 is the apparatus of aspect 13, wherein the request to change the target BLER is received based on a change in a condition associated with the target BLER.

Aspect 15 is the apparatus of any of aspects 13-14, wherein the change in the condition corresponds to a change in a power consumption of the UE.

Aspect 16 is the apparatus of any of aspects 13-15, wherein the request to change the target BLER is triggered by the UE based on the change in the condition.

Aspect 17 is the apparatus of any of aspects 13-16, wherein the request to change the target BLER is triggered by the base station.

Aspect 18 is the apparatus of any of aspects 13-17, wherein the at least one processor is further configured to: calculate, based on the request, the indication to change the target BLER, wherein the indication to change the target BLER is transmitted based on the calculation.

Aspect 19 is the apparatus of any of aspects 13-18, wherein the UE is capable of adjusting a complexity associated with a near-ML demodulation at the UE based on changing the target BLER.

Aspect 20 is the apparatus of any of aspects 13-19, wherein the request to change the target BLER is aperiodic or periodic.

Aspect 21 is the apparatus of any of aspects 13-20, wherein the at least one processor is further configured to: receive, from the UE, a capability indication indicating a capability to adjust a computational complexity based on the target BLER.

Aspect 22 is the apparatus of any of aspects 13-21, wherein the target BLER is negatively correlated with a power consumption of the UE.

Aspect 23 is the apparatus of any of aspects 13-22, wherein the target BLER is negatively correlated with a retransmission probability.

Aspect 24 is the apparatus of any of aspects 13-23, wherein the UE further comprises a receiver using near-ML demodulation and MMSE demodulation.

Aspect 25 is the apparatus of any of aspects 13-24, further comprising a transceiver coupled to the at least one processor, the at least one processor configured to: receive the request to change the target BLER from the UE via the transceiver; and transmit, to the UE and in response to the request, an indication to change the target BLER via the transceiver.

Aspect 26 is a method of wireless communication for implementing any of aspects 1 to 12.

Aspect 27 is an apparatus for wireless communication including means for implementing any of aspects 1 to 12.

Aspect 28 is a computer-readable medium storing computer executable code, where the code when executed by a processor causes the processor to implement any of aspects 1 to 12.

Aspect 29 is a method of wireless communication for implementing any of aspects 13 to 25.

Aspect 30 is an apparatus for wireless communication including means for implementing any of aspects 13 to 25.

Aspect 31 is a computer-readable medium storing computer executable code, where the code when executed by a processor causes the processor to implement any of aspects 13 to 25.

What is claimed is:

1. An apparatus for wireless communication at a user equipment (UE), comprising:
   memory; and
   at least one processor coupled to the memory and configured to:
      transmit, to a base station, a capability indication indicating a capability to adjust a computational complexity based on a target block error rate (BLER);
      transmit, to the base station, a request to change the target BLER of the UE; and
      receive, from the base station and in response to the request, an indication to change the target BLER.

2. The apparatus of claim 1, wherein the at least one processor is further configured to:
   identify a change in a condition associated with the target BLER, wherein to transmit the request to change the target BLER, the at least one processor is configured to transmit the request to change the target BLER based on the change in the condition.

3. The apparatus of claim 2, wherein the change in the condition corresponds to a change in a power consumption of the UE.

4. The apparatus of claim 2, wherein the request to change the target BLER is triggered by the UE based on the change in the condition.

5. The apparatus of claim 1, wherein the request to change the target BLER is triggered by the base station.

6. The apparatus of claim 1, further comprising:
a demodulator capable of adjusting a complexity associated with a near-maximum likelihood (ML) demodulation based on changing the target BLER.

7. The apparatus of claim 1, wherein the request to change the target BLER is aperiodic or periodic.

8. The apparatus of claim 1, wherein the target BLER is negatively correlated with a power consumption of the UE.

9. The apparatus of claim 1, wherein the target BLER is negatively correlated with a retransmission probability.

10. The apparatus of claim 1, wherein the UE further comprises a receiver using near-maximum likelihood (ML) demodulation and minimum mean square error (MMSE) demodulation.

11. The apparatus of claim 1, further comprising a transceiver coupled to the at least one processor, the at least one processor configured to:
transmit the request to change the target BLER to the base station via the transceiver; and
receive, from the base station and in response to the request, an indication to change the target BLER via the transceiver.

12. An apparatus for wireless communication at a base station, comprising:
memory; and
at least one processor coupled to the memory and configured to:
receive, from a user equipment (UE), a capability indication indicating a capability to adjust a computational complexity based on a target block error rate (BLER) of the UE;
receive, from the UE, a request to change the target BLER of the UE; and
transmit, to the UE and in response to the request, an indication to change the target BLER.

13. The apparatus of claim 12, wherein to receive the request to change the target BLER, the at least one processor is configured to receive the request to change the target BLER based on a change in a condition associated with the target BLER.

14. The apparatus of claim 13, wherein the change in the condition corresponds to a change in a power consumption of the UE.

15. The apparatus of claim 13, wherein the request to change the target BLER is triggered by the UE based on the change in the condition.

16. The apparatus of claim 12, wherein the request to change the target BLER is triggered by the base station.

17. The apparatus of claim 12, wherein the at least one processor is further configured to:
calculate, based on the request, the indication to change the target BLER, wherein to transmit the indication to change the target BLER, the at least one processor is configured to transmit the indication to change the target BLER based on the calculation.

18. The apparatus of claim 12, wherein the UE is capable of adjusting a complexity associated with a near-maximum likelihood (ML) demodulation at the UE based on changing the target BLER.

19. The apparatus of claim 12, wherein the request to change the target BLER is aperiodic or periodic.

20. The apparatus of claim 12, wherein the target BLER is negatively correlated with a power consumption of the UE.

21. The apparatus of claim 12, wherein the target BLER is negatively correlated with a retransmission probability.

22. The apparatus of claim 12, wherein the UE further comprises a receiver using near-maximum likelihood (ML) demodulation and minimum mean square error (MMSE) demodulation.

23. The apparatus of claim 12, further comprising a transceiver coupled to the at least one processor, the at least one processor configured to:
receive the request to change the target BLER from the UE via the transceiver; and
transmit, to the UE and in response to the request, an indication to change the target BLER via the transceiver.

24. A method for wireless communication at a user equipment (UE), comprising:
transmitting, to a base station, a capability indication indicating a capability to adjust a computational complexity based on a target block error rate (BLER);
transmitting, to the base station, a request to change the target BLER of the UE; and
receiving, from the base station and in response to the request, an indication to change the target BLER.

25. The method of claim 24, wherein the UE is capable of adjusting a complexity associated with a near-maximum likelihood (ML) demodulation at the UE based on changing the target BLER.

26. The method of claim 24, wherein the request to change the target BLER is aperiodic.

27. The method of claim 24, wherein the request to change the target BLER is periodic.

28. A method for wireless communication at a base station, comprising:
receiving, from a user equipment (UE), a capability indication indicating a capability to adjust a computational complexity based on a target block error rate (BLER) of the UE;
receiving, from the UE, a request to change the target BLER of the UE; and
transmitting, to the UE and in response to the request, an indication to change the target BLER.

* * * * *